United States Patent
Yamashita et al.

(10) Patent No.: US 8,469,524 B2
(45) Date of Patent: Jun. 25, 2013

(54) PROJECTION DISPLAY DEVICE

(75) Inventors: Takao Yamashita, Osaka (JP);
Masahiro Uchiyama, Funabashi (JP);
Akio Muraji, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 145 days.

(21) Appl. No.: 13/269,581

(22) Filed: Oct. 8, 2011

(65) Prior Publication Data

US 2012/0086922 A1    Apr. 12, 2012

(30) Foreign Application Priority Data

Oct. 8, 2010    (JP) .................................. 2010-229091

(51) Int. Cl.
*G03B 21/14*    (2006.01)

(52) U.S. Cl.
USPC ............................................. 353/97; 353/121

(58) Field of Classification Search
USPC ............................................. 353/88, 97, 121
See application file for complete search history.

(56) References Cited

U.S. PATENT DOCUMENTS

| 6,648,476 | B2 * | 11/2003 | Watanabe et al. | 353/97 |
| 7,575,330 | B2 * | 8/2009 | Allen et al. | 353/85 |
| 7,748,854 | B2 * | 7/2010 | Sugino et al. | 353/97 |
| 2012/0069180 | A1 * | 3/2012 | Kawamura | 348/143 |

FOREIGN PATENT DOCUMENTS

JP    2008-158012 A    7/2008

* cited by examiner

*Primary Examiner* — William C Dowling
(74) *Attorney, Agent, or Firm* — Novak Druce Connolly Bove + Quigg LLP (57) ABSTRACT

A projection display device includes: an aperture part which narrows light traveling toward an imager; a control part which controls the aperture part; a detection part which detects brightness of an image to be projected; and a determination part which determines whether the image is a still image or a moving image. In this arrangement, the control part operates the aperture part so as to narrow the light when the brightness of the image detected by the detection part is darker than predetermined brightness, and operates the aperture part so as to further narrow the light when the brightness of the image detected by the detection part becomes darker than the predetermined brightness. In addition, the control part sets the predetermined brightness for operating the aperture part so as to be darker when the image is the still image than when the image is the moving image.

4 Claims, 6 Drawing Sheets

FOR MOVING IMAGES

AMOUNT OF OPENING

FULLY OPENED

FULLY CLOSED

0%  50%  100%  APL

FIG. 4B

FOR STILL IMAGES

AMOUNT OF OPENING

FULLY OPENED

FULLY CLOSED

0%  5%  100%  APL

PROJECTION DISPLAY DEVICE

This application claims priority under 35 U.S.C. Section 119 of Japanese Patent Application No. 2010-229091 filed Oct. 8, 2010, entitled "PROJECTION DISPLAY DEVICE". The disclosure of the above application is incorporated herein by reference.

BACKGROUND OF THE INVENTION

1. Field of the Invention

The present invention relates to a projection display device that modulates light from a light source and projects the modulated light onto a projection plane.

2. Disclosure of Related Art

A projection display device (hereinafter, referred to as "projector") modulates light from a light source by an imager, and projects the modulated light (hereinafter, referred to as "image light") onto a projection plane.

Such a projector may be configured for contrast feeling enhancement to adjust the amount of light radiated to the imager, in accordance with brightness of an image to be projected onto the projection plane. For example, an aperture mechanism variable in size of an opening (hereinafter, referred to as "amount of opening") is provided in the middle of a light path from the light source to the imager. Based on an input image signal, an average picture level (APL) is determined, and the amount of opening of the aperture mechanism is more reduced with the smaller APL.

However, when the amount of light from the light source is reduced by the aperture mechanism as described above, part of the light is blocked out by the aperture mechanism. Accordingly, the amount of the light radiated to the imager is likely to vary, and thus images projected onto the projection plane are prone to have color unevenness.

In the case of projecting moving images, the images are in motion and change quickly, and thus color unevenness in the images is inconspicuous. In particular, pictures in movies and TV programs are formed frequently in variety of colors and are further inconspicuous in color unevenness. Therefore, color unevenness is unlikely to become a problem with moving images.

Meanwhile, in the case of projecting still images, the images are motionless and change extremely slowly, and thus color unevenness in the images is conspicuous. In addition, still images of drawings as information materials for making a presentation or the like, are frequently prepared in a smaller number of colors, which makes color unevenness in the images further conspicuous.

Moreover, color unevenness is more conspicuous in brighter images.

Therefore, regardless of still images or moving images, a high contrast feeling can be obtained if the amount of light is adjusted in the same manner between dark to bright images. However, color unevenness may be significantly conspicuous in bright still images.

On the other hand, color unevenness can be made inconspicuous even in still images if the amount of light is adjusted only for dark images. In such an arrangement, however, contrast feeling is unnecessarily deteriorated in moving images.

SUMMARY OF THE INVENTION

A first aspect of the present invention relates to a projection display device that projects an image onto a projection plane. The projection display device in this aspect includes: a light source; an imager which modulates light from the light source in accordance with an image signal; an aperture part which narrows light traveling toward the imager; a control part which controls the aperture part; a detection part which detects brightness of the image; and a determination part which determines whether the image is a still image or a moving image In this arrangement, the control part operates the aperture part so as to narrow the light when the brightness of the image detected by the detection part is darker than predetermined brightness, and operates the aperture part so as to further narrow the light when the brightness of the image detected by the detection part becomes darker than the predetermined brightness. In addition, the control part sets the predetermined brightness for operating the aperture part so as to be darker when the image is the still image than when the image is the moving image.

BRIEF DESCRIPTION OF THE DRAWINGS

These and other objects, and novel features of the present invention will become more apparent upon reading the following detailed description of the embodiment along with the accompanying drawings.

The drawings are provided only for describing the present invention, and do not limit the scope of the present invention.

DESCRIPTION OF PREFERRED EMBODIMENTS

A projector in an embodiment of the present invention will be described below with reference to the drawings.

In this embodiment, a light source lamp 201 corresponds to a "light source" recited in the claims; liquid crystal panels 212, 214, and 217 correspond to an "imager" recited in the claims; a variable aperture 205 corresponds to an "aperture part" recited in the claims; a brightness detection circuit 403*b* corresponds to a "detection part" recited in the claims; an image determination circuit 403*a* corresponds to a "determination part" recited in the claims; and a CPU 407 corresponds to a "control part" recited in the claims. However, correspondences in description between the claims and this embodiment are merely examples and do not limit the scope of the claims to this embodiment.

Figure 1:
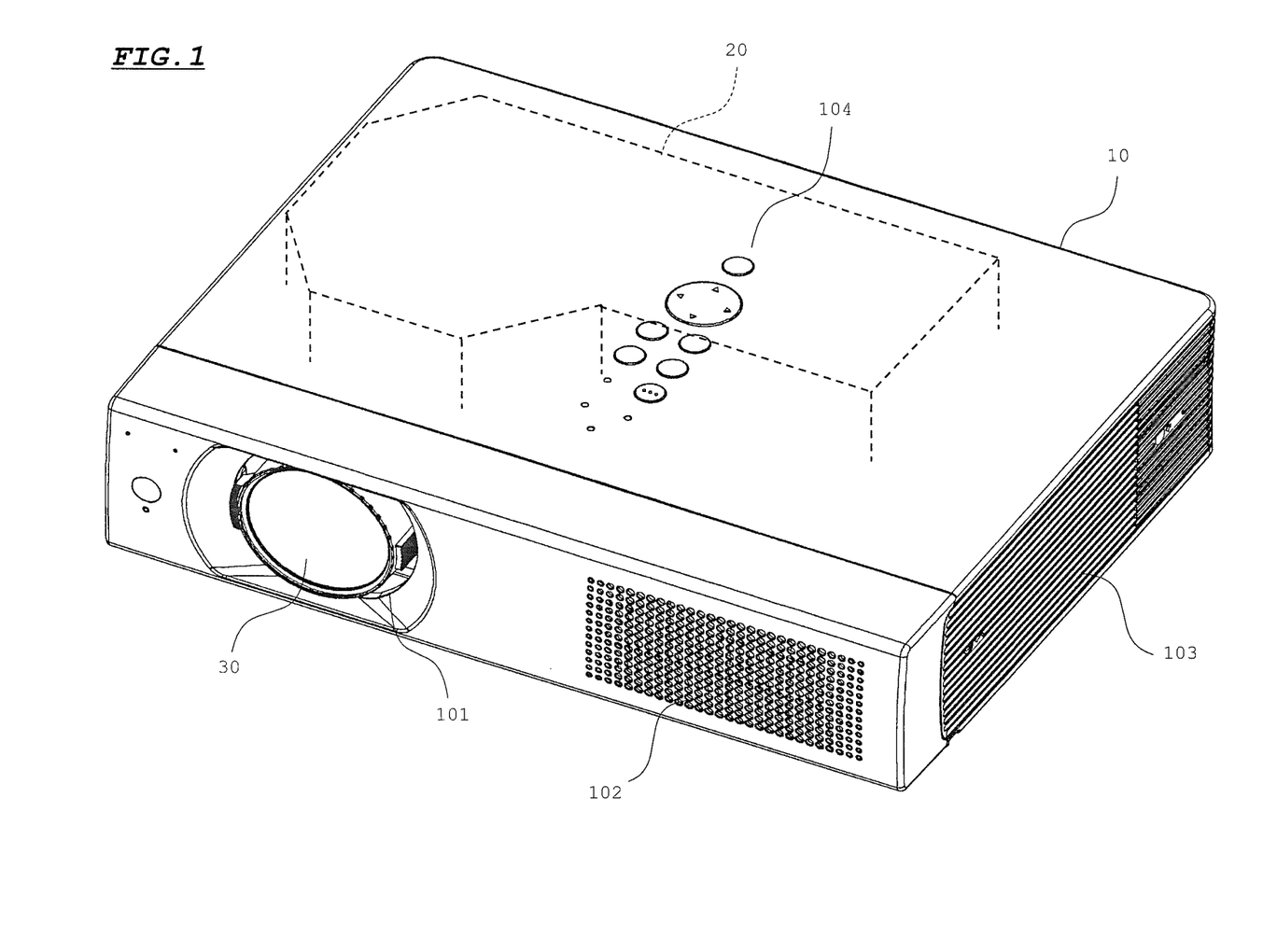
FIG. 1 is a diagram showing a configuration of a projector in an embodiment of the present invention.

FIG. 1 is a diagram showing a configuration of the projector. Referring to FIG. 1, the projector includes a cabinet 10 in the shape of a landscape-oriented, approximately rectangular parallelepiped. The cabinet 10 has a projection window 101 on a left side of a front surface thereof, and has air outlets 102 and 103 for discharging air from an interior of the cabinet 10 on a right side of the front surface and a right side surface thereof, respectively. In addition, the cabinet 10 also has on a top surface thereof an operation part 104 with a plurality of operation keys.

The cabinet 10 contains an optical engine 20 and a projection lens 30. The optical engine 20 generates image light modulated in accordance with an image signal. The projection lens 30 is attached to the optical engine 20, and a front end portion of the projection lens 30 is exposed forward at the projection window 101. The projection lens 30 enlarges and projects the image light generated at the optical engine 20 onto a screen plane disposed in front of the projector.

Figure 2:
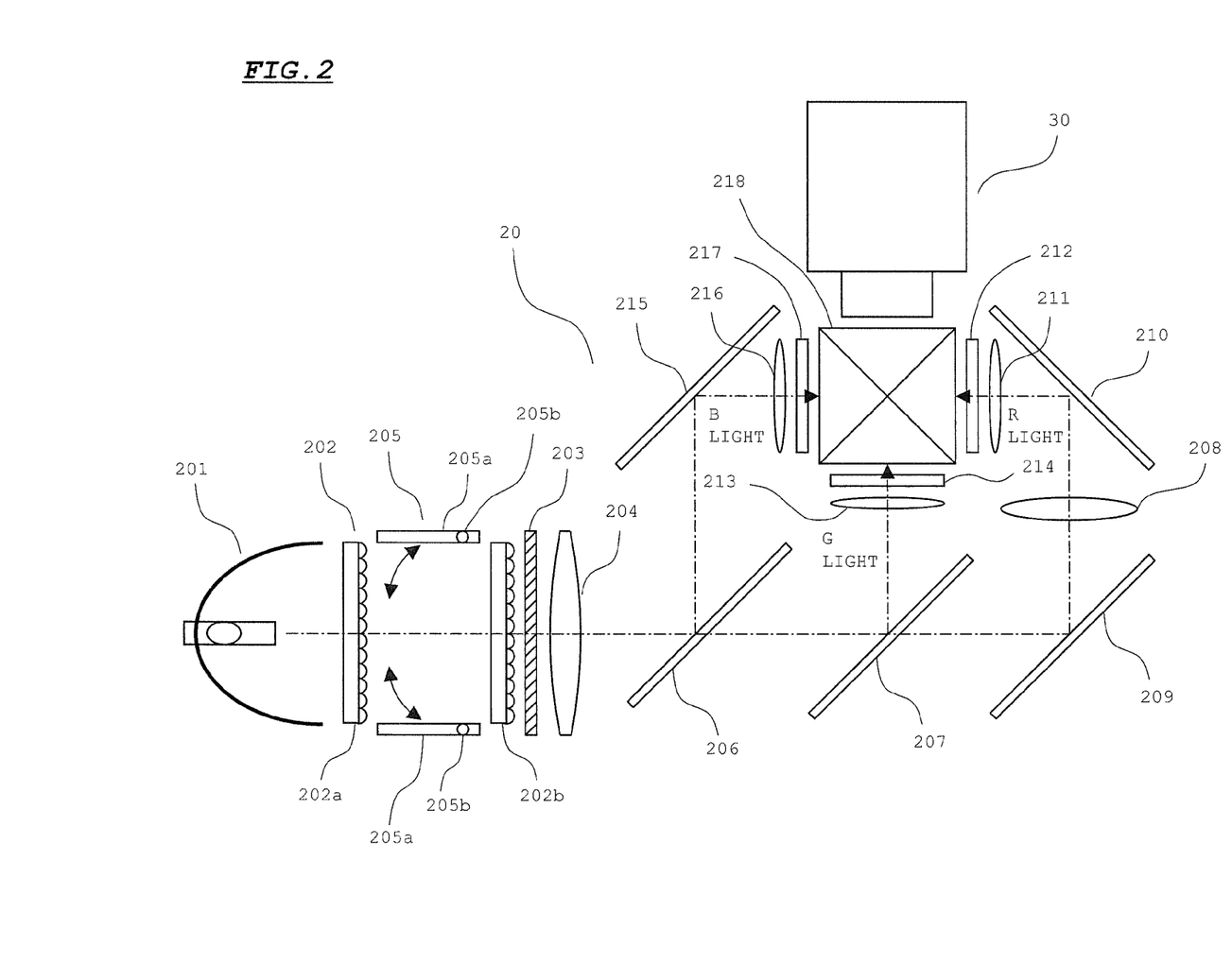
FIG. 2 is a diagram showing a configuration of an optical engine in the embodiment.

FIG. 2 is a diagram showing a configuration of the optical engine 20.

The light source lamp 201 includes a luminous body which emits white light and a reflector which reflects the light emitted from the luminous body. The luminous body may use an ultra-high pressure mercury lamp, a xenon lamp, or the like, for example.

The white light emitted from the light source lamp 201 passes through a fly-eye integrator 202, a PBS array 203, and a condenser lens 204. The fly-eye integrator 202 has a pair of lenses 202a and 202b, each of which is composed of a large number of small lenses arranged in a fly-eye pattern. These small lenses split the incident light. The split light is superimposed by the condenser lens 204 on liquid crystal panels (described later). This provides a unified distribution of amount of light radiated to the liquid crystal panels. In addition, the light split by the fly-eye integrator 202 is aligned by the PBS array 203 in one direction of polarization.

The variable aperture 205 is interposed between the lenses 202a and 202b of the fly-eye integrator 202. The variable aperture 205 includes a pair of open-close doors 205a and shaft parts 205b supporting rotatably the open-close doors 205a. The shaft parts 205b are coupled to a drive motor 205c described later (refer to FIG. 3) via a transfer mechanism not shown. When the drive motor 205c operates, the two open-close doors 205a are opened or closed in cooperation as shown by arrows in the diagram. The amount of light from the light source is narrowed down in accordance with the amount of opening of the open-close doors 205a. When the pair of open-close doors 205a is fully opened, almost all of the light passes through the variable aperture 205. When the pair of open-close doors 205a is fully closed, almost all of the light is blocked out by the variable aperture 205.

The light having passed through the condenser lens 204 is entered into a dichroic mirror 206. Out of the incident light, the dichroic mirror 206 lets light in a red wavelength range (hereinafter, referred to as "R light") and light in a green wavelength range (hereinafter, referred to as "G light") pass through, and reflects light in a blue wavelength range (hereinafter, referred to as "B light").

The R and G lights having passed through the dichroic mirror 206, are entered into a dichroic mirror 207. The dichroic mirror 207 lets the R light pass through and reflects the G light.

The R light having passed through the dichroic mirror 207, is guided to a condenser lens 211 by a relay lens 208 and reflection mirrors 209 and 210, and passes through the condenser lens 211, and then is radiated to the liquid crystal panel 212. The liquid crystal panel 212 is driven in accordance with an image signal for red color, and modulates the R light depending on the driven state. In addition, the liquid crystal panel 212 has on an incident side thereof an incident-side polarizer not shown, so that the R light is radiated through the incident-side polarizer to the liquid crystal panel 212. Further, the liquid crystal panel 212 has on an output side thereof an output-side polarizer not shown, so that the R light from the liquid crystal panel 212 is entered into the output-side polarizer.

The G light reflected by the dichroic mirror 207, passes through a condenser lens 213 and is radiated to the liquid crystal panel 214. The liquid crystal panel 214 is driven in accordance with an image signal for green color, and modulates the G light depending on the driven state. In addition, the liquid crystal panel 214 has on an incident side thereof an incident-side polarizer not shown, so that the G light is radiated through the incident-side polarizer to the liquid crystal panel 214. Further, the liquid crystal panel 214 has on an output side thereof an output-side polarizer not shown, so that the G light from the liquid crystal panel 214 is entered into the output-side polarizer.

The B light reflected by the dichroic mirror 206, is guided to a condenser lens 216 by a reflection mirror 215, and passes through the condenser lens 216 and then is radiated to the liquid crystal panel 217. The liquid crystal panel 217 is driven in accordance with an image signal for blue color, and modulates the B light depending on the driven state. In addition, the liquid crystal panel 217 has on an incident side thereof an incident-side polarizer not shown, so that the B light is radiated through the incident-side polarizer to the liquid crystal panel 217. Further, the liquid crystal panel 217 has on an output side thereof an output-side polarizer not shown, so that the B light from the liquid crystal panel 217 is entered into the output-side polarizer.

The R, G, and B lights modulated by the liquid crystal panels 212, 214, and 217 and emitted from the output-side polarizers, are entered into a dichroic prism 218. The dichroic prism 218 reflects the R and B lights and lets the G light pass through, thereby combining the R, G, and B lights. Accordingly, the color-combined image light is emitted from the dichroic prism 218 toward the projection lens 30.

Instead of the transmissive liquid crystal panels 212, 214, and 217, imagers forming the optical engine 20 may use reflective liquid crystal panels or MEMS devices. In addition, the optical engine 20 may not be a three-plate optical system including three imagers as described above, but may be a single-plate optical system using one imager and a color wheel, for example.

Figure 3:
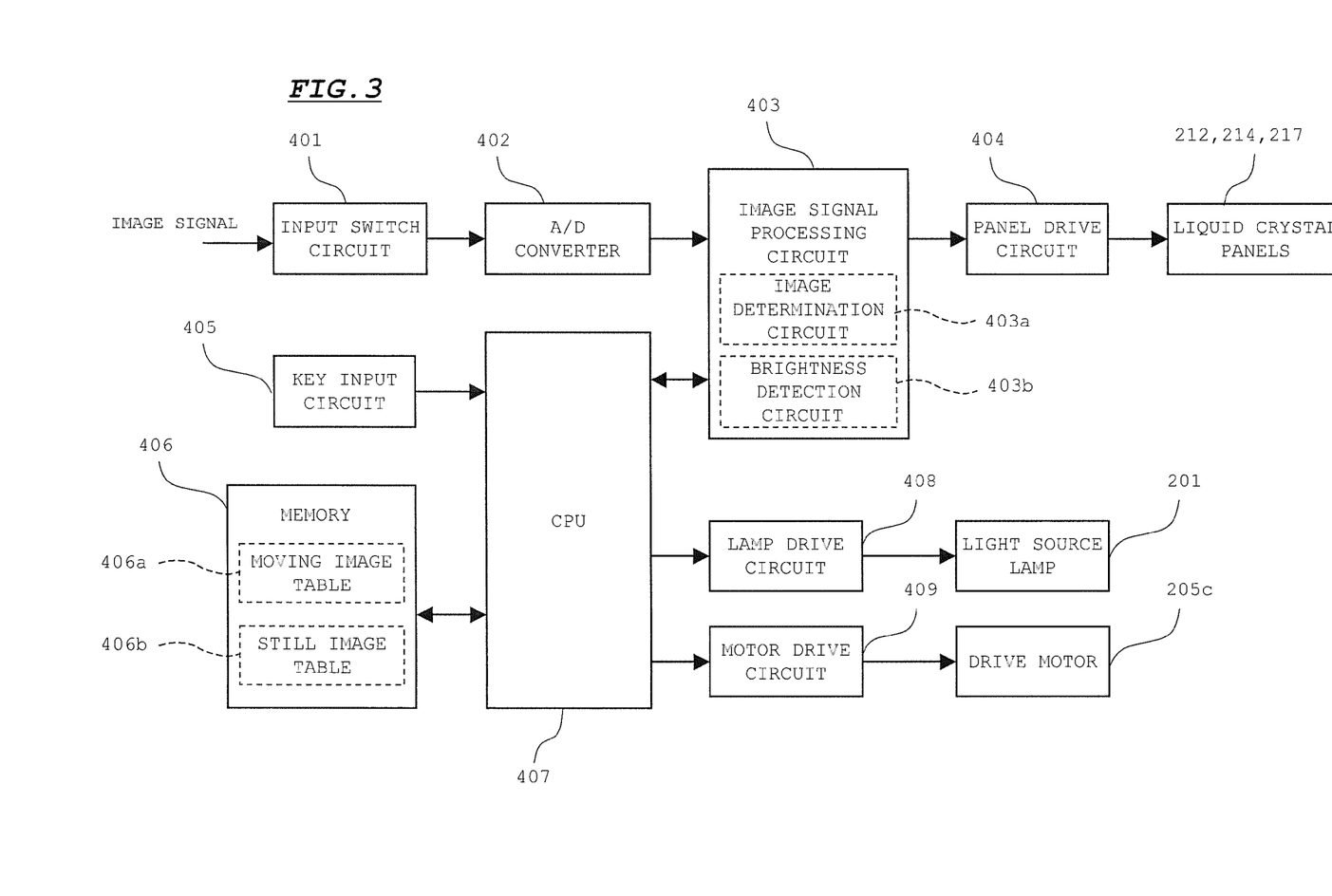
FIG. 3 is a diagram showing a configuration of a circuit system of the projector in the embodiment.

FIG. 3 is a diagram showing a configuration of a circuit system of the projector.

An input switch circuit 401 switches between input terminals to be connected out of a plurality of input terminals. The input terminal connected by the input switch circuit 401 inputs an image signal. If the input image signal is an analog signal, an A/D converter 402 converts the analog signal into a digital signal, and inputs the same into an image signal processing circuit 403. In contrast, if the input image signal is a digital signal, the digital signal is input directly into the image signal processing circuit 403 bypassing the A/D converter 402.

The image signal processing circuit 403 performs various correction processes such as scaling correction (correcting the number of pixels), gamma correction, and the like. In addition, if the input signal is not in the form of RGB signal but in the form of brightness signal and color-difference signal, for example, the image signal processing circuit 403 converts the corrected image signal into an RGB signal and outputs the RGB signal to a panel drive circuit 404. The panel drive circuit 404 drives the liquid crystal panels 212, 214, and 217, in accordance with the input RGB signal.

The image signal processing circuit 403 includes an image determination circuit 403a and a brightness detection circuit 403b.

The image determination circuit 403a detects a horizontal synchronization frequency of the input image signal, and determines whether the detected horizontal synchronization frequency matches a horizontal synchronization frequency of an SD signal or an HD signal. The SD signal is an image signal with a display specification (resolution) of standard definition (SD). The HD signal is an image signal with a display specification (resolution) of high definition (HD).

If the input image signal is an SD signal or an HD signal, the image signal is likely to represent a moving image. In contrast, if the input image signal is not an SD signal or an HD signal but a signal of a display specification (resolution) of XGA, VGA, or the like, the image signal is likely to represent a still image output from a personal computer.

Accordingly, if the detected horizontal synchronization frequency matches a horizontal synchronization frequency of an SD signal or an HD signal, the image determination circuit 403a outputs to the CPU 407 a determination signal indicating that the input image represents a moving image. In contrast, if the detected horizontal synchronization frequency does not match a horizontal synchronization frequency of an SD signal or an HD signal, the image determination circuit 403a outputs to the CPU 407 a determination signal indicating that the input image represents a still image.

The brightness detection circuit 403b uses a brightness signal contained in the image signal to determine an average picture level (APL) of an image of one frame, and outputs the determined APL as a detection signal to the CPU 407. If the input image signal is an RGB signal, the brightness detection circuit 403b calculates brightness from the RGB signal by a predetermined arithmetic operation, and determines an APL from the calculated brightness.

A key input circuit 405 outputs to the CPU 407 an input signal in accordance with a key operation from the operation part 104.

A memory 406 includes a RAM and a ROM. The memory 406 stores a control program for providing the CPU 407 with a control function. In addition, the memory 406 also stores two control tables (a moving image table 406a and a still image table 406b) for use in control of the variable aperture 205. The moving image table 406a is used for the cases where moving images are to be projected. The still image table 406b is used for the cases where still images are to be projected.

Figure 4A:
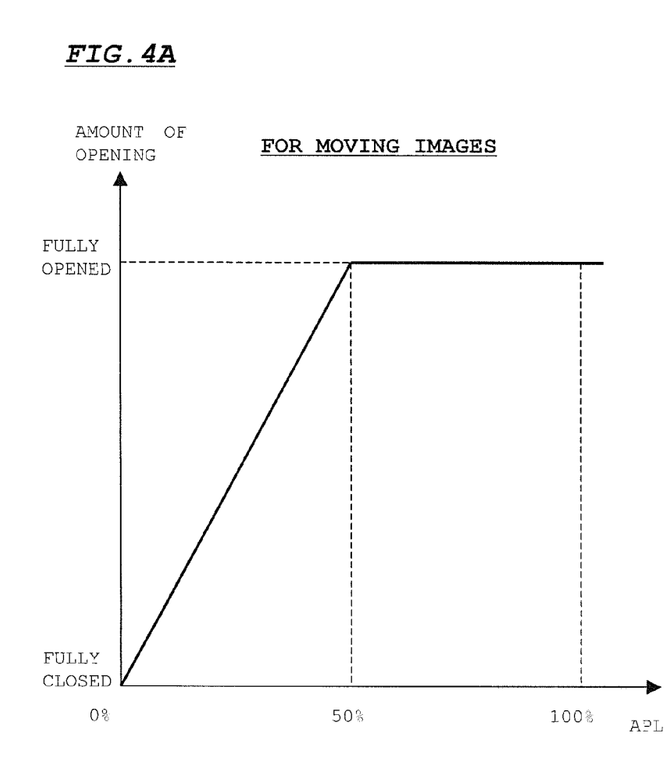
FIGS. 4A and 4B are diagrams showing a relationship between APL and the amount of opening of a variable aperture in the cases where still images are to be projected and where moving images are to be projected.

The moving image table 406a is set with the amount of control of the drive motor 205c (for example, the number of steps from an original point) corresponding to the APL, such that the APL and the amount of opening of the variable aperture 205 satisfy a relationship as shown in FIG. 4A. If moving images are to be projected, the amount of opening of the variable aperture 205 is more reduced with the smaller APL within an APL range of 50 to 0%, as shown in FIG. 4A. The variable aperture 205 is fully opened with an APL of 50% and is fully closed with an APL of 0%. In addition, the variable aperture 205 is fully opened with an APL range of 50 to 100%. The APL becomes 0% when a projected image is entirely black, and the APL becomes 100% when a projected image is entirely white.

Figure 4B:
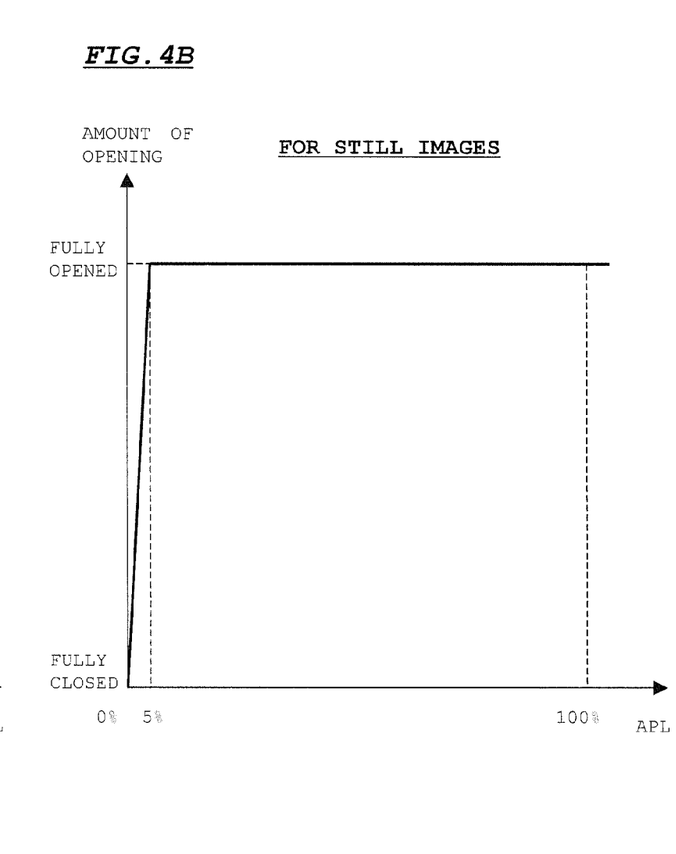

Meanwhile, the still image table 406b is set with the amount of control of the drive motor 205c (for example, the number of steps from an original point) corresponding to the APL, such that the APL and the amount of opening of the variable aperture 205 satisfy a relationship as shown in FIG. 4B. If still images are to be projected, the amount of opening of the variable aperture 205 is more reduced with the smaller APL within an APL range of 5 to 0%, as shown in FIG. 4B. The variable aperture 205 is fully opened with an APL of 5% and is fully closed with an APL of 0%. In addition, the variable aperture 205 is fully opened with an APL range of 5 to 100.

As shown in FIGS. 4A and 4B, if still images are to be projected, the range of APL in which the amount of light is reduced by the variable aperture 205, is narrowed as compared with the cases where moving images are to be projected.

The CPU 407 controls the image signal processing circuit 403 in accordance with the control program stored in the memory 406. In addition, the CPU 407 outputs control signals to a lamp drive circuit 408 and a motor drive circuit 409 in accordance with the control program, thereby to control the light source lamp 201 and the drive motor 205c.

The lamp drive circuit 408 drives the light source lamp 201 in accordance with the control signal from the CPU 407.

The motor drive circuit 409 drives the drive motor 205c in accordance with the control signal from the CPU 407. The drive motor 205c may use a stepping motor, for example. In this case, the motor drive circuit 409 supplies pulse power to the drive motor 205c, and the drive motor 205c rotates by an amount corresponding to the number of pulses.

Figure 5:
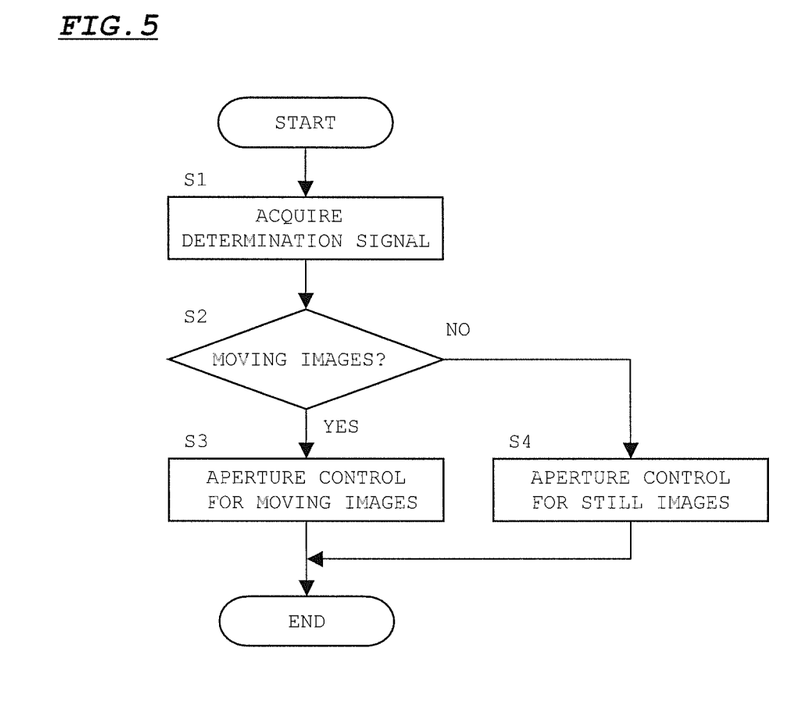
FIG. 5 is a flowchart of a processing operation relating to control of the variable aperture in the embodiment.

FIG. 5 is a flowchart of a processing operation in relation to control of the variable aperture 205.

When the projector is started and an image signal is input from outside, the CPU 407 acquires a determination signal from the image determination circuit 403a (S1). Then, the CPU 407 determines whether images to be projected are moving images or still images, on the basis of the acquired determination signal (S2).

If having determined that moving images are to be projected (S2: YES), the CPU 407 executes aperture control for moving images (S3). On the other hand, if having determined that still images are to be projected (S2: NO), the CPU 407 executes aperture control for still images (S4).

The aperture control here will be described below in detail. The amount of opening in the aperture control is adjusted by a plurality of frames (hereinafter, referred to as "block"), considering the capability of following opening and closing of the variable aperture 205.

After having acquired APLs from the brightness detection circuit 403b, the CPU 407 averages APLs of all frames in one block to calculate the APL in the one block. Then, in the case of the aperture control for moving images, the CPU 407 acquires the number of steps corresponding to the calculated APL from the moving image table 406a. In the case of the aperture control for still images, the CPU 407 acquires the same from the still image table 406b.

The memory 406 stores the number of steps at the present point. The CPU 407 acquires the number of steps at the present point from the memory 406, and determines a difference between the number of steps corresponding to the APL and the number of steps at the present point, that is, determines the number of steps for actually rotating the drive motor 205c. Then, the CPU 407 outputs a control signal corresponding to the determined number of steps (hereinafter, referred to as "step signal") to the motor drive circuit 409. Accordingly, the motor drive circuit 409 supplies pulse power corresponding to the step signal to rotate the drive motor 205c. Then, the amount of opening of the variable aperture 205 is set so as to correspond to the calculated APL.

In synchronization with a timing at which the image signal processing circuit 403 outputs an image signal for one block, the CPU 407 outputs a step signal corresponding to the block to the motor drive circuit 409. Accordingly, while the liquid crystal panels 212, 214, and 217 are driven in accordance with the image signal for the block, the variable aperture 205 is opened by an amount depending on the APL for the block, and light is radiated to the liquid crystal panels 212, 214, and 217 by an amount in accordance with the amount of opening.

In this manner, while an image signal is input, the aperture control for moving images is executed at step S3 or the aperture control for still images is executed at step S4, thereby to adjust the amount of opening of the variable aperture 205 in accordance with the APL for each block.

If the aperture control for moving images is executed, the variable aperture 205 is operated such that the amount of opening is more reduced with the smaller APL in the APL range of 0 to 50%, as shown in FIG. 4A. On the other hand, if the aperture control for still images is executed, the variable aperture 205 is operated such that the amount of opening is more reduced with the smaller APL in the APL range of 0 to as shown in FIG. 4B.

When input of an image signal is stopped, the processing operation is terminated. After that, if a new image signal is input, the processing operation is executed from the first. Specifically, it is determined whether images to be projected are moving images or still images based on a determination signal (S1 and S2), the aperture control for moving images or the aperture control for still images is executed (S3 or S4).

As with this embodiment, if the amount of light from the light source lamp 201 is reduced by the variable aperture 205, part of the light is blocked out by opening and closing of the open-close doors 205a of the variable aperture 205. Due to this, the amount of light radiated to the liquid crystal panels 212, 214, and 217 is prone to have variations, which results in color unevenness in images projected onto a projection plane.

If moving images are projected, such color unevenness is inconspicuous because the images move quickly. However, if still images are projected, color unevenness is conspicuous because the images hardly move. Besides, if projected images are bright, color unevenness is also conspicuous. On the other hand, if projected images are dark, color unevenness is inconspicuous.

In this embodiment, it is determined whether images to be projected are moving images or still images. If still images are projected, the range of APL in which the amount of light is reduced by the variable aperture 205, is narrowed as compared with the cases where moving images are projected. Therefore, if moving images are to be projected, the variable aperture 205 performs light amount adjustments in a wide range of dark to bright images. This makes a sufficient difference in brightness between bright images and dark images, thereby achieving sufficient contrast feeling enhancement. On the other hand, if still images are to be projected, the variable aperture 205 does not operate on bright images, which makes color unevenness inconspicuous.

In addition, in this embodiment, it is determined whether images to be projected are moving images or still images by identifying the display specification (resolution) of an image signal on the basis of the horizontal synchronization frequency of the image signal. Accordingly, it is possible to make a determination on still images or moving images in a simple way.

MODIFICATION EXAMPLE

Figure 6:
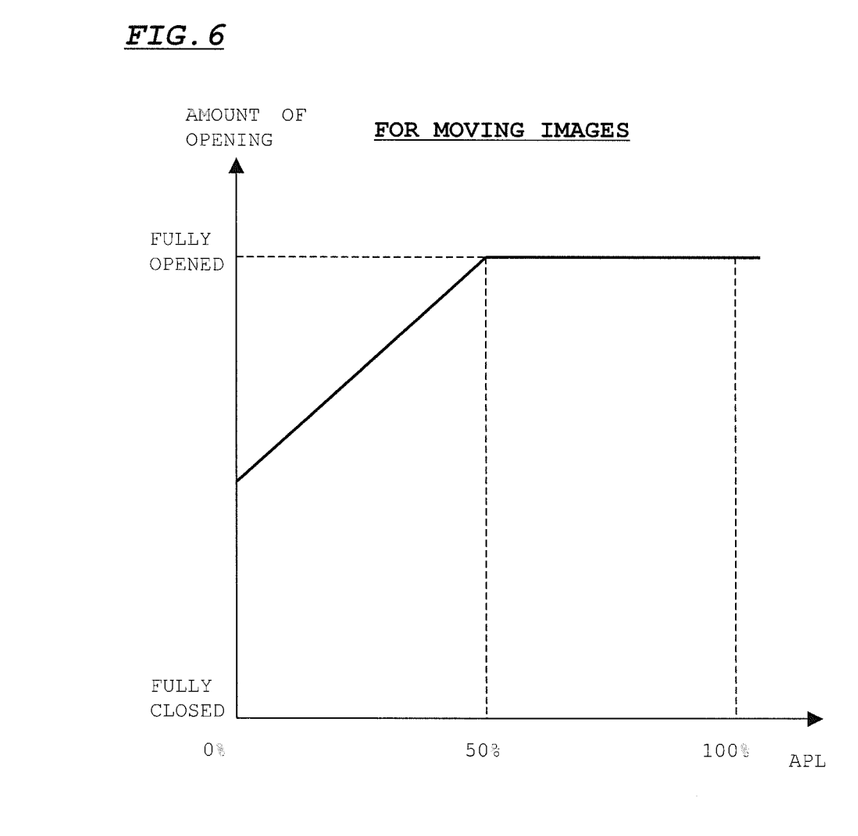
FIG. 6 is a diagram for describing a modification example of aperture control for moving images.

FIG. 6 is a diagram for describing a modification example of aperture control for moving images.

In the foregoing embodiment, if moving images are to be projected, the variable aperture 205 is operated between the fully opened state and the fully closed state, as shown in FIG. 4A.

Meanwhile, in this modification example, if moving images are to be projected, the operation range of the variable aperture 205 is limited as shown in FIG. 6. Specifically, if moving images are to be projected, the operation range of the variable aperture 205 is made smaller as compared with the cases where still images are to be projected.

Accordingly, in this modification example, the memory 406 stores a moving image table 406a different from that in the foregoing embodiment. The moving image table 406a in this modification example is set with the amount of control of the drive motor 205c (for example, the number of steps from an original point) corresponding to the APL, such that the APL and the amount of opening of the variable aperture 205 satisfy a relationship as shown in FIG. 6. The amount of opening of the variable aperture 205 is more reduced with the smaller APL in the APL range of 50 to 0%, as shown in FIG. 6. The variable aperture 205 is fully opened with the APL of 50%, and is opened by a predetermined amount with the APL of 0%. In addition, the variable aperture 205 is fully opened in the APL range of 50 to 100%.

This arrangement narrows the opening and closing range of the variable aperture 205, whereby changes in color unevenness are less prone to appear in projected images even if the opening and closing speed of the open-close doors 205a is low. Accordingly, it is possible to suppress conspicuity of color unevenness in moving images due to changes in color unevenness.

This modification example is particularly useful for the cases of using inexpensive variable apertures that are opened and closed at lower speeds.

In addition, the amount of opening with the APL of 0% is predetermined by experiment or the like, so as to obtain proper contrast feeling while suppressing conspicuity of color unevenness.

OTHERS

The embodiment of the present invention can be modified in various manners besides the foregoing one.

For example, in the foregoing embodiment, the image determination circuit 403a detects the horizontal synchronization frequency of an input image signal, and determines whether images to be projected are moving images or still images, on the basis of the detected horizontal synchronization frequency. However, the image determination circuit 403a is not limited to this but may be configured to detect whether any variations occur in all brightness signals for one frame during a predetermined period of time (the number of frames), thereby making a determination as to moving images or still images, for example. In this case, if there are no variations in all the brightness signals for one frame during the predetermined period of time, the image determination circuit 403a determines that still images are to be projected. In contrast, if a variation occurs in any of the brightness signals during the predetermined period of time, the image determination circuit 403a determines that moving images are to be projected.

In addition, in the foregoing embodiment, the brightness detection circuit 403b determines the APL of an image for one frame using a brightness signal contained in an image signal, and outputs the determined APL as a detection signal. That is, the APL is an average of brightness of pixels forming an image. However, the brightness detection circuit 403b is not limited to this but may be configured to sum up the brightness of pixels forming an image and outputs the summed brightness as a detection signal, for example.

Further, in the foregoing embodiment, the variable aperture 205 is configured to be varied in amount of opening by the two rotational open-close doors 205a. However, the variable aperture 205 may be configured in any other manner as far as the same can be varied in amount of opening.

Besides, the embodiment of the invention may be changed or modified in various ways as necessary, as far as such changes and modifications do not depart from the scope of the claims of the invention.

What is claimed is:

1. A projection display device that projects an image onto a projection plane, comprising:
    a light source;
    an imager which modulates light from the light source in accordance with an image signal;
    an aperture part which narrows light traveling toward the imager;
    a control part which controls the aperture part;
    a detection part which detects brightness of the image; and
    a determination part which determines whether the image is a still image or a moving image, wherein
    the control part operates the aperture part so as to narrow the light when the brightness of the image detected by the detection part is darker than predetermined brightness, and operates the aperture part so as to further narrow the light when the brightness of the image detected by the detection part becomes darker than the predetermined brightness, and
    the control part sets the predetermined brightness for operating the aperture part so as to be darker when the image is the still image than when the image is the moving image.

2. The projection display device according to claim 1, wherein
    the determination part determines whether the image is the still image or the moving image on the basis of a horizontal synchronization frequency of the image signal.

3. The projection display device according to claim 1, wherein
    the detection part determines an average brightness of the image from brightness information contained in the image signal, and detects brightness of the image in accordance with the average brightness.

4. The projection display device according to claim 1, wherein
    when the image is determined as the moving image, the control part operates the aperture part in an opening and closing range smaller than an opening and closing range in which the aperture part can be operated.

* * * * *